United States Patent [19]
Pruett et al.

[11] Patent Number: 6,154,790
[45] Date of Patent: Nov. 28, 2000

[54] MONITORING AND REPORTING HARD DISK DRIVES IDENTIFICATION USING RADIO FREQUENCY

[75] Inventors: Gregory B. Pruett, Durham; Gregory W. Kilmer; James P. Ward, both of Raleigh, all of N.C.

[73] Assignee: International Business Machines, Armonk, N.Y.

[21] Appl. No.: 09/113,838

[22] Filed: Jul. 10, 1998

[51] Int. Cl.[7] .................................................. G06F 13/10
[52] U.S. Cl. .................. 710/15; 710/7; 710/19; 710/129; 709/229; 711/103; 713/200; 714/36; 714/719; 340/572.1
[58] Field of Search ................................. 710/7, 129, 19, 710/15; 714/36, 719; 709/229; 711/103; 713/200; 340/572.1

[56] References Cited

U.S. PATENT DOCUMENTS

| | | | |
|---|---|---|---|
| 5,289,372 | 2/1994 | Guthrie et al. | 364/403 |
| 5,572,195 | 11/1996 | Heller et al. | 340/825.35 |
| 5,629,981 | 5/1997 | Nerlikar | 380/25 |
| 5,715,174 | 2/1998 | Cotichini et al. | 364/514 |
| 5,862,117 | 1/1999 | Fuentes et al. | 369/100 |
| 5,936,527 | 8/1999 | Isaacman et al. | 340/572.1 |
| 5,949,335 | 9/1999 | Maynard | 340/572.1 |
| 5,970,227 | 10/1999 | Dayan et al. | 395/186 |
| 5,983,369 | 11/1999 | Bakoglu et al. | 714/46 |
| 6,046,676 | 4/2000 | Ward et al. | 340/572.1 |

*Primary Examiner*—Thomas C. Lee
*Assistant Examiner*—Thuan Du
*Attorney, Agent, or Firm*—George E. Grosser; Joseph A. Sawyer, Jr.

[57] ABSTRACT

The present invention is directed towards a method and system for retrieving and reporting serial numbers of hard disk drives in a computer system. The method and system include electronically obtaining the serial number of each of the hard disk drives. The method and system also include providing the serial number of each of the hard disk drives to a display via a browser. The method and system additionally include copying the serial number of each of the hard disk drives to a radio frequency (RF) enabled memory, wherein the serial numbers can be logged utilizing an RF reader. The RF reader may be included in an RF gate and/or a hand held device. Computer systems with Radio Frequency Identification (RFID) technology configured in accordance with the present invention enable automated electronic tracking of computer assets such as the hard disk drives as they pass through the RF gate in or out of a portal. Computer systems with the RFID technology also enable the automated electronic tracking of the hard disk drives or other computer assets via the hand held device. In either case, no direct contact with the hard disk drive is needed for the tracking and reporting.

16 Claims, 7 Drawing Sheets

MONITORING AND REPORTING HARD DISK DRIVES IDENTIFICATION USING RADIO FREQUENCY

FIELD OF THE INVENTION

The present invention relates to computer systems assets tracking and protection and more particularly to electronic tracking and protection of hard disk drives.

DESCRIPTION OF RELATED ART

Personal computer and workstation systems (computers) are well known in the art. Computers include components such as hard disk drives, dual in line memories (DIMMs), monitors, central processing units (CPUs), and other components. Computers and their respective components, are highly valuable assets. At the same time, computers and computer components are easily portable and easily reconfigured. The more compact the computers and the computer components the easier it is to transport them. Moreover, the more conforming the computers and computer components are to industry standards the easier it is to reconfigure the computers with exchanged or stolen components.

Thus, assets management, misplacement and theft of computers and computer components present a major problem. As a result, there exists an ever increasing need for improved computer assets management and protection such as security for computers against the unauthorized removal or theft of their components In addition, today, computer networks (networks) are employed to provide increased computing power and efficiency to a plurality of computers which are located throughout a large area. Through the network, the plurality of computers are generally interlinked with each other and with a server system or a central processing center. However, the dissemination of the computers throughout the large area compounds the computer assets tracking and protection problem.

Computers provided by IBM Corporation currently carry a tamper detection switch, which can detect when a computer cover has been removed and causes the computers to be functionally disabled on subsequent boots until the user successfully enters an appropriate password. This and other similar mechanisms adequately protects the overall computer system but does not deter theft of the components within the computer, nor does it provide means for tracking computer assets.

Accordingly, a number of methods have been developed for guarding against the unauthorized removal of computer systems. One such method is the use of Electronic Article Surveillance (EAS) tags which are widely used in commercial markets for everything from clothing to Compact Disks. When an item with an EAS tag is carried through a portal, the portal sounds an audible alarm to notify security of a tamper event. The EAS tags are attached or embedded in computer systems to provide a notification of when an asset is removed.

Although useful for retail applications, EAS technology is less effective for protecting corporate assets such as computers and computer components. Opportunities may exist for employees to defeat the technology by removing the tags, transferring components through a mail service, or reusing components in other computers within the building.

It is therefore desirable to provide a system and method that provide tracking and protection of computer assets. The tracking and protection of computer assets should be automated and easily implemented in various computer systems environments. The present invention addresses such a need.

SUMMARY OF THE INVENTION

The present invention is directed towards a method and system for retrieving and reporting serial numbers of hard disk drives in a computer system. The method and system include electronically obtaining the serial number of each of the hard disk drives. The method and system also include providing the serial number of each of the hard disk drives to a display via a browser. The method and system additionally include copying the serial number of each of the hard disk drives to a radio frequency (RF) enabled memory, wherein the serial numbers can be logged utilizing an RF reader. The RF reader may be included in an RF gate and/or a hand held device. Computer systems with Radio Frequency Identification (RFID) technology configured in accordance with the present invention enable automated electronic tracking of computer assets such as the hard disk drives as they pass through the RF gate in or out of a portal. Computer systems with the RFID technology also enable the automated electronic tracking of the hard disk drives or other computer assets via the hand held device. In either case, no direct contact with the hard disk drive is needed for the tracking and reporting.

DETAILED DESCRIPTION OF THE INVENTION

The present invention relates to computer systems assets tracking and protection and more particularly to electronic tracking and protection of hard disk drives. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

In accordance with the present invention, the system and method for an automated electronic tracking and protection of hard disk drives in a computer utilize hard disk drives identification for monitoring and reporting hard disk drives presence. Hard disk drives identification, also known as serialization information (serialization), is electronically readable and includes a serial number.

The serial numbers of the hard disk drives are logged in a radio frequency (RF)-enabled EEPROM through a serial bus interface, and an RF reader obtains the serial numbers through an RF link to the RF-enabled EEPROM. Electronically monitoring and reporting of the serialization via a browser such as, in a preferred embodiment, a Desktop Management Interface (DMI) browser, and/or via the RF link to the RF reader, automates the tracking and protection of hard disk drives. The RF reader can be included, for example, in RF gates installed in portal entryways or in hand held devices. Hence, there is no need for direct connection to the hard disk drives in order to provide the automated electronic tracking and protection thereof.

In the preferred embodiment, the system and method in accordance with the present invention additionally utilize a software program such as, for example, the AssetCare software program by IBM corporation, for implementing the automated tracking and protection of hard disk drives. In this case, the software program is executed by the computer under an operating system. The operating system and the software program each comprises computer readable instructions which, in general, are tangibly embodied in or are readable from a media such as a system memory, data storage devices including the hard disk drives, and/or a data communications device. When executed by the computer, the instructions cause the computer to perform steps associated with implementing the present invention. Thus, the automated tracking and protection of hard disk drives may be implemented as a method, system, or an article of manufacture (a computer-readable media or device) using programming and/or engineering techniques to produce software, hardware, firmware, or any combination thereof.

Figure 1:
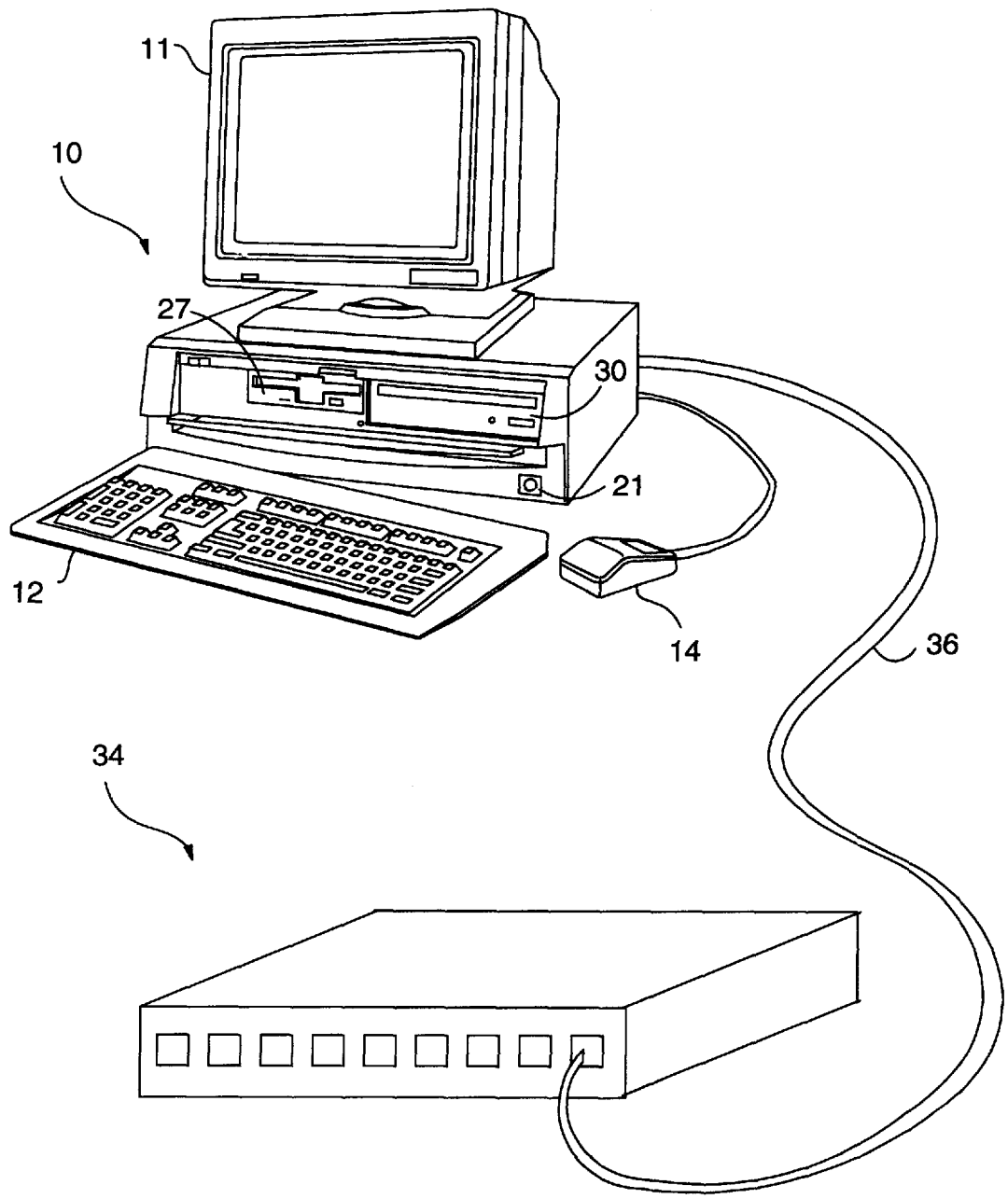
FIG. 1 illustrates a computer embodying the system and method in accordance with the present invention which can be connected to a network through a hub.

The system and method are implemented in personal computer and workstation systems (computers) as hereafter described. A computer 10 embodying the system and method in accordance with the present invention is illustrated in FIG. 1. The computer 10 may have an associated display monitor 11, keyboard 12, mouse 14, and printer or plotter (not shown). The computer 10 is typically connected to a network. The network could be of type Ethernet, Token Ring, ATM, or other mechanism used to transmit data.

In the preferred embodiment the network is a local area network (LAN). A LAN attachment is provided, for example, through hub 34 which is connected to the computer 10 via a cable 36, wherein effective communication may be established with other computers through links comprising electrically conductive connections and/or radiation links including fiber optic links and infrared links. The other computers may be physically remote from or, conversely, adjacent to computer 10. Each of the computers may be a personal computer or workstation system in the form of a desktop, floor standing or portable computer. Alternatively, one or more of the computers may comprise a computer system which is different than the personal computer or workstation systems in that it is differently configured and/or it has different functional capabilities.

Figure 2:
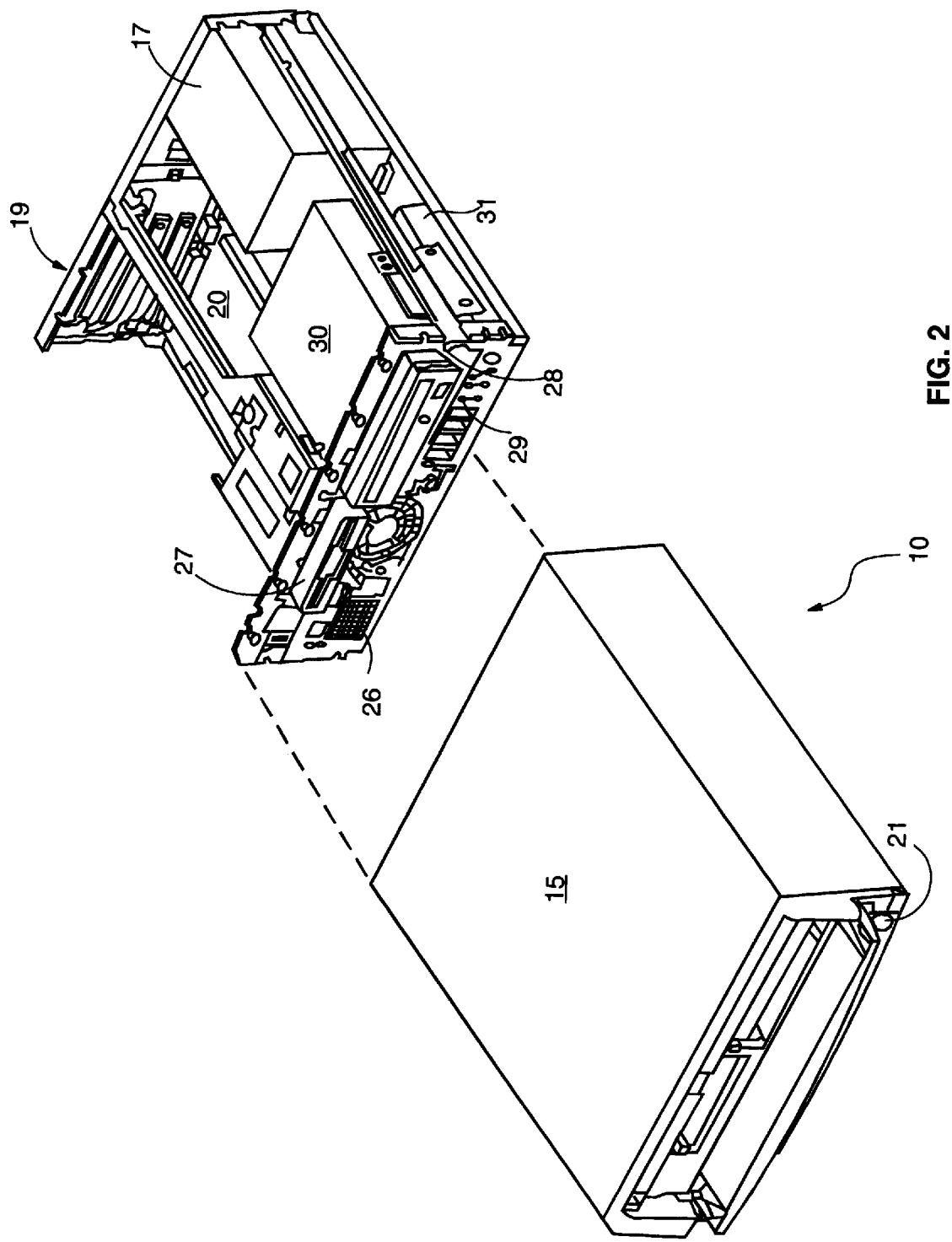
FIG. 2 is a more detailed description of the computer of FIG. 1 which embodies the system and method in accordance with the present invention.

A more detailed description of the computer 10 which embodies the system and method in accordance with the present invention is provided in conjunction with FIG. 2. As illustrated in FIG. 2, the computer 10 has a cover 15 which is a decorative outer member that cooperates with a chassis 19 in defining an enclosed, shielded volume for receiving electrically powered data processing and storage components for processing and storing digital data. At least some of these components are mounted on a multilayer planar 20 or motherboard which is mounted on the chassis 19. The multilayer planar 20 provides means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the components of the computer 10.

The system 10 has a power supply 17, a power button 21, also herein referred to as switch 21. In the illustrated form, the chassis 19 defines a pair of upper bays 26, 28 and a lower bay 29. One of the upper bays 26 is adapted to receive peripheral drives of a first size (such as those known as 3.5 inch drives) while the other 28 is adapted to receive drives of a different size (such as a CD ROM drive). The lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30, both in FIGS. 1 and 2, and is a removable medium direct access storage device capable of receiving a compact disc inserted there into and using the disc to deliver data as is generally known. One hard disk drive is indicated at 31 in FIG. 2 and is a fixed medium direct access storage device (hard disk drive) capable of storing and delivering data as is generally known.

Figure 3:
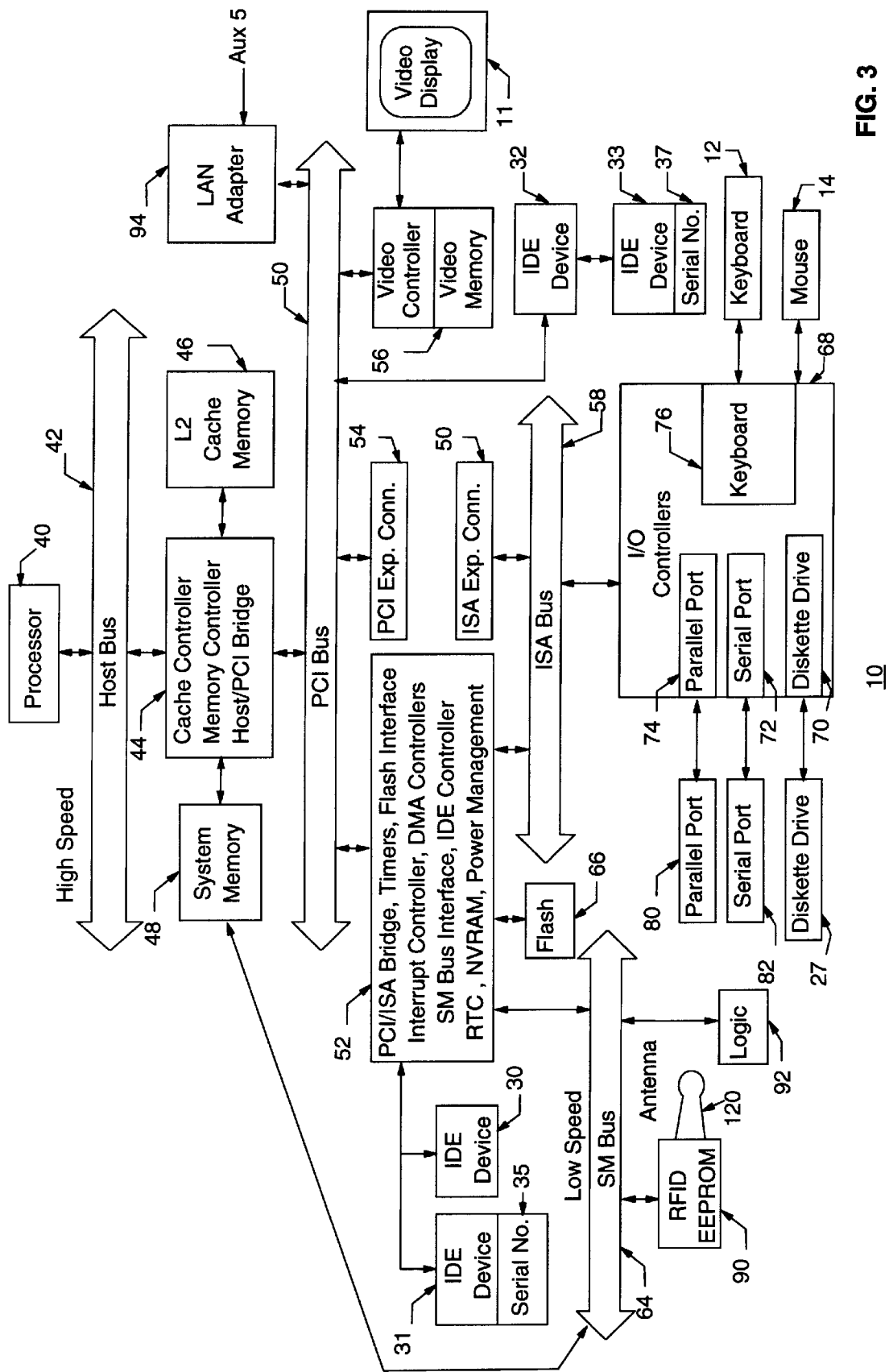
FIG. 3 illustrates a block diagram of a computer configured in accordance with the present invention such as the computer of FIGS. 1 and 2.

The above described computer 10 of FIGS. 1 and 2 is described in further detail in conjunction with FIG. 3. FIG. 3, illustrates a block diagram of a computer configured in accordance with the present invention such as the computer 10 of FIGS. 1 and 2. The computer 10 includes the planar 20 for mounting components on the planar 20. The planar 20 is connected to 10 expansion connectors and other computer hardware such as the system central processing unit (CPU) or processor 40, which is further connected to a high speed CPU host bus 42.

Connected to the CPU host bus 42 are also a first system core logic chipset 44 and an L2 cache memory 46. The first chipset 44 can be, for example, a Triton VX chip by Intel Corporation. The first chipset 44 includes a memory control unit, a cache controller and a peripheral component interconnect (PCI) bridge. The memory control unit is further connected to the system memory 48 comprising one or more modules of memory such as random access memory (RAM). The memory control unit includes memory mapping logic for mapping CPU 40 addresses to particular address spaces in system memory 48 etc. The cache controller is operatively coupled to the L2 cache memory 46.

The PCI bridge within the first chipset 44 provides an interface between the CPU host bus 42 which is used as a local bus and a PCI bus 50. Coupled to the PCI bus 50 is a second core chipset 52. The second chipset 52 can be, for example, a PIIX4 chip by Intel Corporation. The second chipset 52 contains a bus control and timing unit, a plurality of timers, an interrupt controller, a direct access memory (DMA) unit, nonvolatile CMOS RAM, also herein referred to as NVRAM, a CMOS real-time clock (RTC), a System Management (SM) bus controller, a PCI/ISA bridge, flash memory interface, power management logic and an integrated drive electronics (IDE) controller. Attached to the second chipset 52 is a flash memory (FM) module or chip 66.

The RTC is used for time of day calculations and the NVRAM is used to store computer system configuration data. That is, the NVRAM will contain values which describe the present configuration of the computer including the types of components associated therewith, the amount of system memory, etc. These values are stored in NVRAM and updated whenever a special configuration program, such as configuration/setup, is executed.

The power management logic within the second chipset 52 manages switching between computer power states such as off, standby, sleep, suspend and normal operating states. The present invention will operate in any of these power states. Accordingly, the description that follows will be independent of power state.

The PCI/ISA bridge within the second chipset 52 provides an interface between the PCI bus 50 and an optional feature or expansion bus such as the Industry Standard Architecture (ISA) bus 58. Coupled to the ISA bus 58 is a multi-function I/O controller 68 such as the PC87307 by National Semiconductor. The I/O controller 68 contains a variety of I/O adapters and other components such as a diskette adapter 70, a serial adapter 72, a parallel adapter 74 and a keyboard controller 76. The diskette adapter 70 provides an interface to the diskette drive 27. The serial adapter 72 has an external port connector 82 for attachment of external devices such as a modem (not shown). The parallel adapter 74 has an external port connector 80 for attachment of external devices such as printers (not shown). The keyboard controller 76 is the interface for the keyboard 12 and the mouse 14. Additionally coupled to the ISA bus 58 are a plurality of ISA expansion connectors 60 for receiving ISA adapter cards (not shown).

The IDE controller within the second chipset 52 interfaces with IDE compatible storage devices such as the hard disk drive 31 and (CD-ROM drive 30. In addition to the second chipset 52, coupled to the PCI bus 50 are a plurality of PCI expansion connectors 54 for receiving PCI bus compatible peripheral cards. One such peripheral card is a video controller 56. The video controller 56 includes video memory and is coupled to the monitor or video display terminal 11. Another peripheral card is a small computer system interface (SCSI) controller 32 which is coupled to a SCSI device such as a SCSI hard disk drive 33.

Hence, the computer 10 configuration illustrated in FIG. 3 supports both the IDE and SCSI hard disk drives 31 and 33. However, one of ordinary skill in the art can readily recognize that the computer 10 may alternatively be configured to support any hard disk drive(s) including either one or both of the IDE and SCSI hard disk drives.

A LAN adapter or subsystem 94 can be coupled to either the PCI bus 50 or the ISA bus 58 for allowing the computer 10 to communicate with the LAN via a connection or link 36 to hub 34 (FIG. 1). The LAN adapter is supplied with auxiliary power (AUX5) from the power supply 17 when the system 10 is off. The LAN adapter can be, for example, the Auto Wake Token-Ring ISA Adapter by IBM corporation.

Further, a planar SM Bus 64 is coupled to the PCI bus 50 and the ISA bus 58 via the SM bus controller within the second chipset 52. The planar SM Bus 64 is an additional I/O bus in computer 10 and is used as a local bus to support slow speed peripheral devices. Logic 92 is coupled to SM bus 64.

RFID (Radio Frequency Identification) EEPROM 90 is coupled to the SM Bus 64 and an RF interface. In a preferred embodiment, the RFID EEPROM 90 is a dual ported non-volatile memory element with both a digital serial ($I^2C$) and RF interface. Hence, is it an RF-enabled EEPROM. The non-volatile memory provides storage for computer assets information such as components serial number and code revisions for the computer 10. The RFID EEPROM 90 can be updated through a digital interface that connects to the SM bus 64 or through the RF interface which connects to antenna 120 which provides the RF link to the RF reader.

While the present invention is described hereinafter with particular reference to the block diagram of FIG. 3, it is to be understood that the system and methods in accordance with the present invention may be used with other hardware configurations, including different planar board configurations. For example, the system processor 40 could be an Intel Pentium processor, Cyrix 586-P75 processor or Advanced Micro Devices 80486 processor or any other suitable processor.

As indicated with reference to FIGS. 1–3, the system and method for the automated electronic tracking and protection of hard disk drives in accordance with the present invention are embodied in a computer such as the above-described computer 10. Also as indicated, in the preferred embodiment, the system and method electronically monitor and report the serialization via the DMI browser and/or the RF link to the RF reader, and further utilize a software program such as the AssetCare software program by IBM corporation for implementing the automated tracking and protection of hard disk drives. In this case, the software program is installed on the hard disk drive 31 or 33 and it is loaded and executed in the system memory 48 after the operating system in the computer 10 has been booted.

During a power-up or system start-up sequence, commands or operations are initiated in order to obtain the computer 10 configuration information including the hard disk drive(s) identification information (i.e., serialization). The configuration obtained during the power-up sequence is stored for future reference in the RFID EEPROM 90 as a last known configuration.

It is noted that different commands or operations may be associated with different devices. Thus, hard disk drives such as the IDE and SCSI hard disk drives may each require a distinct command or operation for retrieving the serialization therefrom. For example, in the preferred embodiment, for the IDE and SCSI hard disk drives, the AssetCare software program issues an ATA (IBM AT compatible attachment) identify command and a SCSI inquiry command, respectively, in order to retrieve their serialization.

In computers, especially computers provided by IBM corporation, hard disk drives such as the IDE and SCSI hard disk drives 31 and 33 (FIG. 3) are provided with electronically readable serialization including unique electronically readable serial numbers 35 and 37. The serial numbers 35 and 37 are read and can then be viewed locally by the computer operator via a browser such as, in the preferred embodiment, an industry standard DMI browser, or they can be retrieved by a system administrator across the network, for example, by using a system management package that supports DMI protocol (e.g. LANDesk or IBM NetFinity system management packages).

The serial numbers 35 and 37 are logged in the RFID EEPROM 90 through the $I^2C$ bus interface and the RF reader(s) obtain the serial numbers 35 and 37 from the RFID EEPROM through the RF link via the antenna 120. The RF readers can be included, for example, in RF gates installed in portal entryways or in hand held devices. With this configuration, inventory of computer assets can be taken even while the computer is powered off. Hence, there is no need for direct connection to the hard disk drives in order to provide their automated electronic tracking and protection.

The unique electronically readable serial numbers 35 and 37, are fixed, for example, in a non-volatile storage in a hard disk drive firmware or in a hidden cylinder on a hard disk drive media. These serial numbers 35 and 37 are provided by hard disk drives vendors and cannot be modified by end users. However, it is noted that the electronically readable serial numbers of the hard disk drives are typically required to match the corresponding serial numbers on labels affixed to the hard disk drives, wherein the labels are visible to the end users.

Figure 4A:
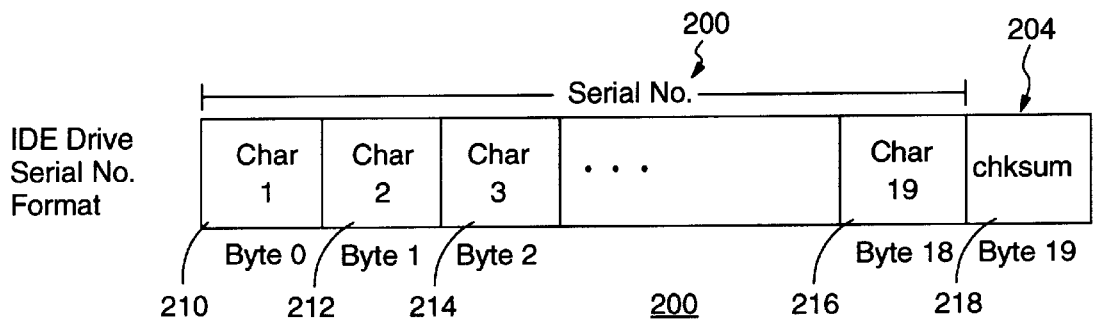
FIGS. 4A and 4B illustrates serial number formats for the IDE (integrated drive electronics) and SCSI (small computer system interface) hard disk drives, respectively.
Figure 4B:
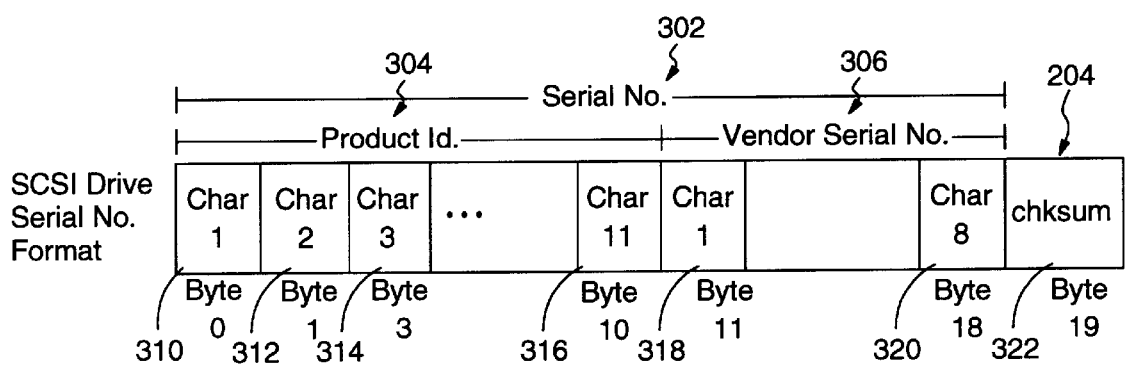

The serial numbers 35 and 37 differ from each other in format based upon the type of hard disk drive they are associated with. FIGS. 4A and 4B illustrates serial number formats for the IDE and SCSI hard disk drives, respectively. Although the system and method are described in terms of these particular serial number formats, it should be understood that other serial number formats for similar or other types of hard disk drives are also within the scope and spirit of the present invention.

As illustrated in FIG. 4A, the IDE hard disk drive (IDE) serial number format 200 comprises a 20-bytes 210, 212 . . . 218 field. The first 19 bytes contain 19 characters, characters 0–18, which form the serial number 202. The 20th byte contains a checksum 204, for example, a binary sum of all the characters. The 20-bytes field is retrievable from the IDE hard disk drive, for example, through the ATA identify command.

FIG. 4B illustrates the serial number format 300 for the SCSI hard disk drive (SCSI serial number format). The serial number 302 also includes 19 characters in 19 bytes 310, 312, . . . 320, and a checksum 322. The 19-bytes SCSI serial number 302 is formed by retrieving from the SCSI hard disk drive the product identification (Id.) and the vendor serial number, 16 characters and 8 characters, respectively. The first 11 characters of the product Id. 304 are then combined with the 8 characters of the vendor serial number 306 to form the serial number 302.

As before-mentioned, the serialization can be viewed locally by the computer operator via the browser, or it can be retrieved by a system administrator across the network using, for example, in the preferred embodiment, system management software that supports DMI (e.g. LANDesk or IBM NetFinity system management software). The DMI 2.0 specification enables information to be retrieved across the network by issuing a remote procedure call (RPC). The browser and, if applicable, the system management software are preloaded on the computer and are also available on a ready-to-configure CD (compact disk).

Figure 5:
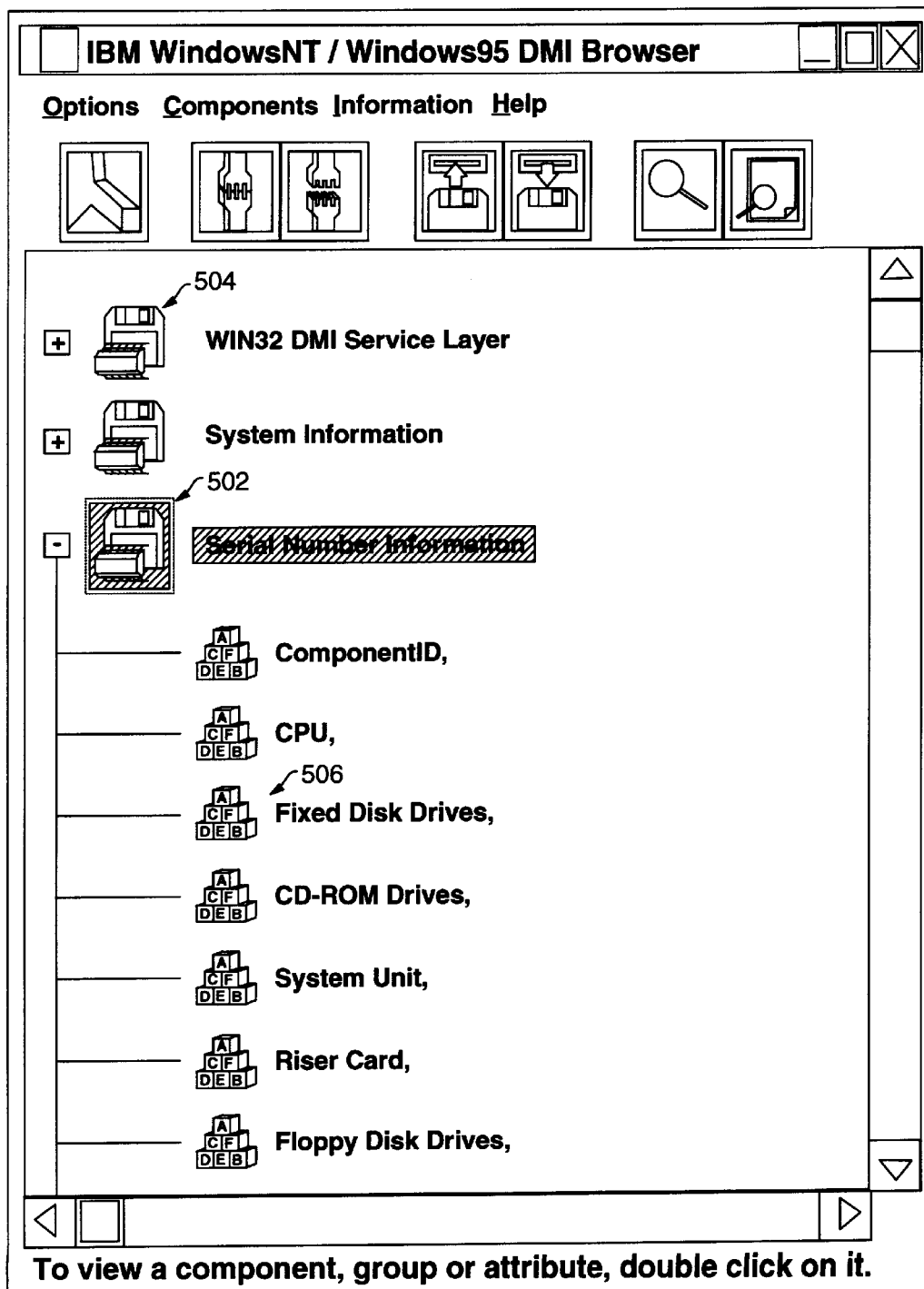
FIG. 5 illustrates how, in the preferred embodiment, computer configurations can be retrieved, for example, in Windows NT using the DMI 1.1 MIF browser by IBM corporation.

FIG. 5 illustrates how, in the preferred embodiment, computer configurations can be retrieved, for example, in Windows NT using the DMI 1.1 MIF browser by IBM corporation. The window 500 includes a win32 DMI service layer icon 504, a serial number information icon 502, a fixed disk drives icon 506 (an icon subordinate to the serial number information icon 502), etc. When a user double clicks for example on the fixed disk drives icon 506, a subsequent window appears showing the serial number for each hard disk drive installed in the computer.

Figure 6:
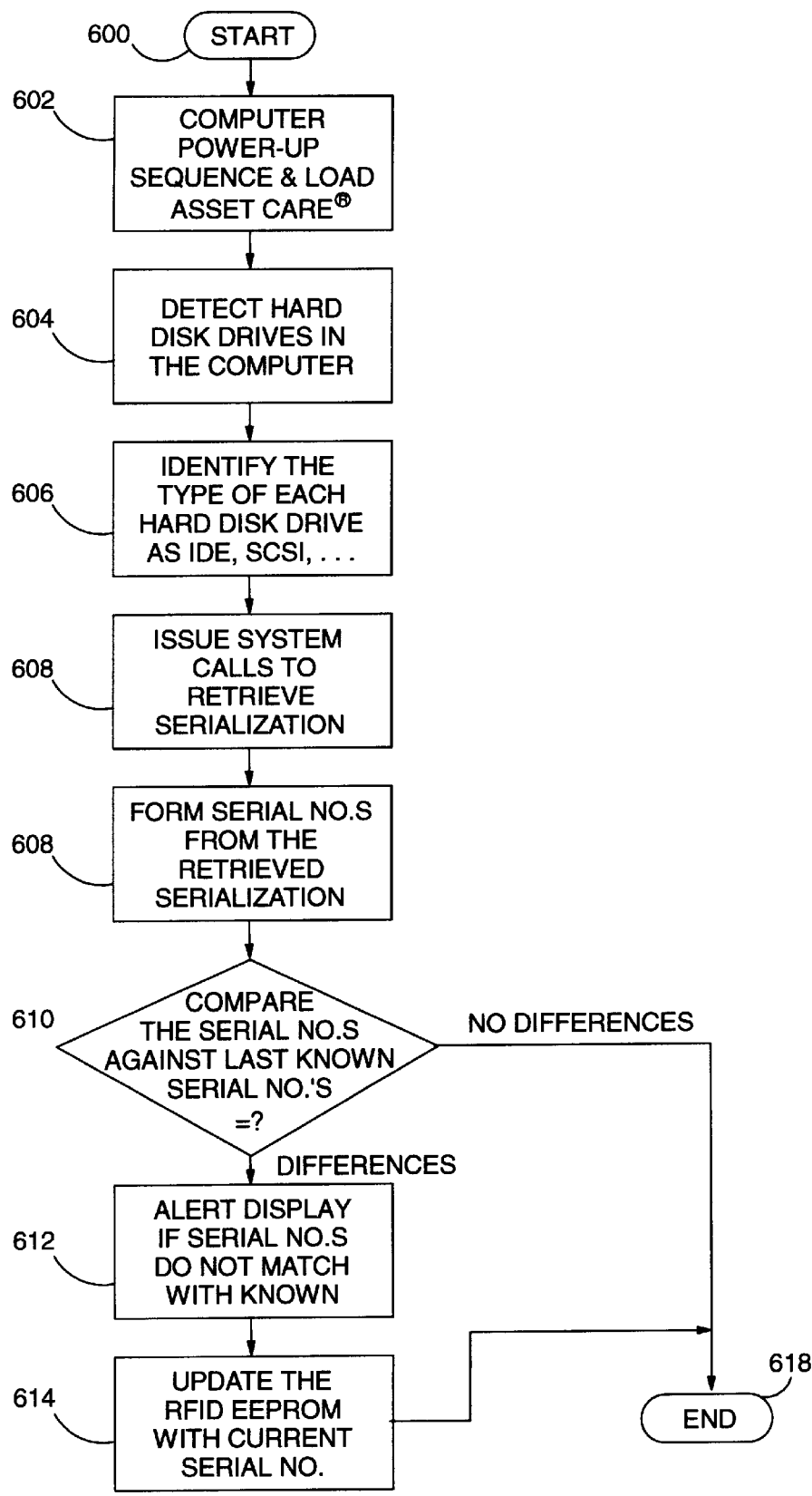
FIG. 6 illustrates the method of implementing the hard disk drives tracking via the serialization information.

The method of implementing the hard disk drives tracking via the serialization information is described in FIG. 6. Upon power-up of the computer, via step 600, the computer commences a power-up sequence, via step 602. In the preferred embodiment, this sequence includes loading the software program into the system memory. The software program includes a software program module for accessing the various computer hardware components. For example, the AssetCare software program includes a Component Instrumentation program module which uses the IBMasst-.DLL to access the hard disk drives.

The hard disk drives in the computer are detected, via step 604, and their type is identified as being either the IDE or SCSI hard disk drive, via step 606. Then, appropriate system calls are issued to the various hard disk drives to retrieve the serialization, via step 608. Once the serialization is obtained, the serial number formats including the serial numbers are formed as described in conjunction with FIGS. 4A and 4B, via step 610.

Then the serial numbers are compared against the last knows serial numbers of the last known configuration, via step 612. If no differences are discovered, via step 612, the process ends, via step 618. However, if any differences are discovered, via step 612, a visible alert is provided indicating that the hard disk drive has been removed or replaced by another, via step 614. In addition, the RFID EEPROM is updated so that it contains the current serial number(s), via step 616. Then the RF reader can obtain the information from the RFID EEPROM even when the computer is powered off.

Figure 7:
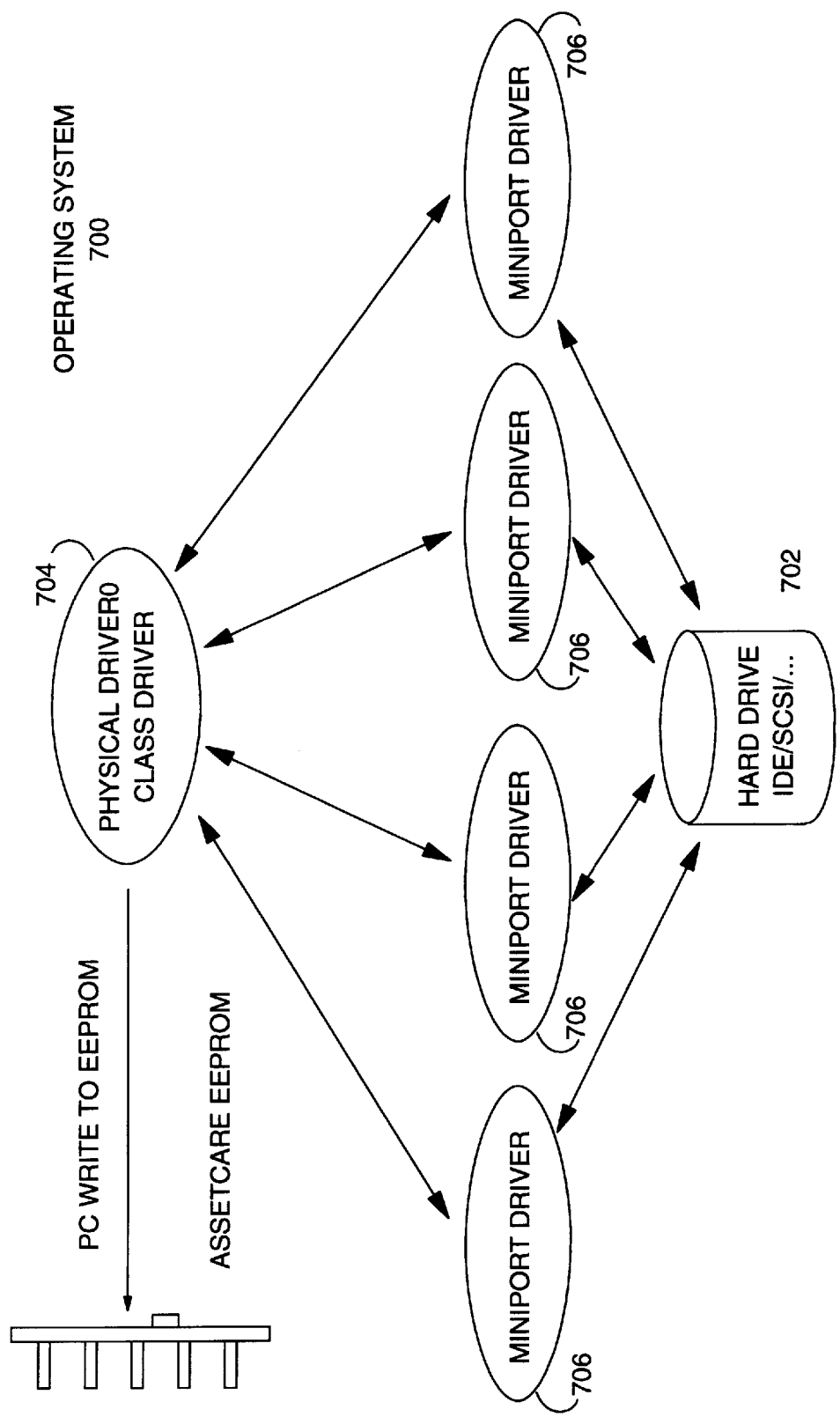
FIG. 7 illustrates a general approach to implementing the method of FIG. 6 supported by various operating systems.

Different operating systems may handle the above-described method, particularly the system calls, in a different way because different operating system have different device driver layers and file control mechanisms. Different commands such as, for example, in the preferred embodiment, the ATA identify command and the SCSI inquiry command for retrieving serialization from IDE and SCSI hard disk drives, respectively, may be treated differently under each of the operating systems. Accordingly, a general approach supported by various operating systems is illustrated in FIG. 7 and described herein below. The following also describes variations from the general approach.

As illustrated in FIG. 7, the various operating systems 700 include a class driver 704 for physical drives such as the hard disk drive 702 and miniport drivers 706 for logic drives. The class driver 704 and the miniport drivers 706 are typically operating system specific. The miniport drivers 706 are typically preloaded and are available for example as a software package on the ready-to-configure CD. In order to issue a command to the hard disk drives, the various operating systems typically issue a call to the miniport drivers 706 by opening the class driver 704 and then sending function calls to the miniport drivers 706. The class driver 704 controls a number of devices which are indexed either as physical drives or as logic drives. Physical drives correspond to the hard disk drives 702 and are conventionally named ?PhysicalDrive0", ?PhysicalDrive1", etc. Logic drives correspond to user-defined sections of the hard disk drives 702 and are conventionally named "C:", "D" etc. In the preferred embodiment, the software program can be executed under a plurality of operating systems including, for example, the Windows NT, Windows 95, and OS/2 operating systems, although the software program is treated differently under each operating system (OS) as hereafter described.

Windows NT Operating System

Under the Windows NT OS, in order to issue the ATA identify command to IDE hard disk drives, the software program module issues a call into miniport drivers 706 such as: ATAPI (AT attachment packet interface), ATDISK (AT disk) and PIIXIDE (PCI to ISA accelerator IDE). Input output control (IOCTL) call functions are used when issuing the calls to the ATAPI, ATDISK and PIIXIDE miniport drivers, respectively.

In order to call into a miniport driver 706 under the Windows NT OS, the software program module opens the class driver 704 for the IDE hard disk drive. The software program module calls into the miniport driver 706 via the class driver 704, for example, by issuing the WNT_SMART_RCV_DRIVE_DATA and IOCTL_SCSI_MINIPORT Component Instrumentation function call.

In order to issue the SCSI inquiry command to the SCSI hard disk drives 702, the software program through the software program module issues a call to the corresponding miniport driver 706. For example, in order to issue the SCSI inquiry command, the Component Instrumentation builds a 6-byte command descriptor block (CDB) and issues a IOCTL_SCSI_PASS_THROUGH_DIRECT function call to the corresponding miniport driver 706. It is noted that, in this case, the miniport driver 706 interfacing with SCSI hard disk drives 702 functions as an advanced SCSI programming interface (ASPI) layer which allows software using the ASPI layer to be SCSI host adapter-independent. The SCSI interface controller (32 FIG. 3) responds to the call and returns the inquiry data, including the serialization.

Since a SCSI request block (SRB) can be handled by any miniport driver 706 interfacing with a SCSI hard disk drive 702, separate code is not required for variations in SCSI hard disk drives. This, however, is not true with respect to miniport drivers 706 interfacing with IDE hard disk drives 702. Each miniport coupled to a miniport driver 706 responds to the inquiry request in a manner commensurate with its hardware configuration. However, the returned data is formatted similarly in a single data structure common to all of them.

It is also noted that the ATAPI miniport driver 706 should not be used with this function call to retrieve serialization from a SCSI hard disk drive 702 because there is no direct mapping from the 20-byte serial number field into the inquiry data structure (as described above with reference to FIG. 4B). This is so even though the ATAPI miniport driver may also be executed with this function call since the ATAPI miniport driver maps the SCSI inquiry command into an IDE identify command.

Windows 95 Operating System

Under the Windows 95 OS, support for the ATA identify command is provided through a miniport driver 706 such as, for example, the SMARTVSD.VXD in the \WINDOWS\SYSTEM\IOSubSys directory. In order to issue the ATA identify command to IDE hard disk drives, the software program module opens the class driver 704 and issues an appropriate function call to the miniport driver 706. For example, the Component Instrumentation issues the W95_SMART_RCV_DRIVE_DATA function call to the miniport driver 706.

Support for the SCSI inquiry command is provided through a miniport driver 706 which functions as an ASPI layer and is known as the WNASPI132.DLL. In order to issue the SCSI inquiry command to SCSI hard disk drives, the software program module issues a respective function call to the miniport driver 706. For example, the Component Instrumentation issues a call to the miniport driver using the SendASPI132Commando( ) function call with an SRB and a handle to the ASPICompletionEvent. The function call will complete asynchronously and signal the event when it is finished. It is noted that device drivers support for issuing the ATA identify and the SCSI inquiry commands, respectively, is included in the Hardware Support Storage Enhancement part of the OEM service release 2 (OSR2).

OS/2 Operating System

Under OS/2 OS the ATA identify command is supported through both the IBM1S506.ADD and PIIXIDE.ADD miniport drivers 706. A SMART-enabled version of the IBM1S506.ADD miniport driver 706 is required in order to issue the ATA identify command.

Accordingly, in the preferred embodiment, the system and method in accordance with the present invention utilizes the software program in order to retrieve serialization information from the hard disk drives and report it via the DMI browser and through the RF link. After obtaining the serialization information from the hard disk drives through the various miniport drivers, the system and method derive the serial numbers from the serialization information and store them for future reference in the RFID EEPROM. The RFID EEPROM can provide the serial numbers to the RF reader(s) via the RF link The automated tracking and protection may utilize the RF link to the RF reader(s) in conjunction with RF gates to monitor hard disk drives as they pass through the RF gates in or out of a portal. The automated tracking and protection may also utilize the RF link to the RF reader(s) in conjunction with the hand held RF enabled device for retrieving the identification of hard disk drives proximate thereto. Additionally, the reporting of the information through the browser such as, the DMI browser in the preferred embodiment, can be adopted as an industry-standard mechanism for accessing computer assets information for automated inventory purposes as well as for the automated tracking and protection. Hence, the above-described system and method create a paradigm for the automated electronic tracking and protection of computer assets and particularly hard disk drives.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for retrieving and reporting serial numbers of hard disk drives in a computer system, the method comprising the steps of:
   a) electronically obtaining the serial number of each of the hard disk drives;
   b) providing the serial number of each of the hard disk drives to a display via a browser; and
   c) copying the serial number of each of the hard disk drives to a radio frequency (RF) enabled memory, wherein the serial numbers can be logged utilizing an RF reader means.

2. The method of claim 1, wherein the electronically obtaining step (a) further includes the step of;
   a1) executing a power-up sequence during which the serial numbers are retrieved from the hard disk drives.

3. The method of claim 2, wherein the electronically obtaining step (a) further includes the step of:
   a2) comparing the serial numbers with corresponding last known serial numbers, wherein a mismatch in the serial numbers indicates that the corresponding hard disk drives have been replaced.

4. The method of claim 3, wherein the browser includes a desktop management interface (DMI) browser.

5. The method of claim 4, wherein the DMI browser is used for local viewing of the serial numbers on the display.

6. The method of claim 4, wherein the browser further includes a DMI protocol compatible system management means for viewing the serial numbers across a network.

7. The method of claim 4, wherein the RF enabled memory comprises an RF identification (RFID) EEPROM.

8. The method of claim 7, wherein the RFID EEPROM comprises a dual-ported non-volatile memory with both digital serial and RF interfaces, and wherein the RFID EEPROM can be updated via both a digital serial and RF interfaces.

9. The method of claim 4, wherein each of the hard disk drives comprises one of an integrated drive electronics (IDE) and a small computer system interface (SCSI) hard disk drive.

10. The method of claim 9, wherein each of the serial numbers has a format that is structured based on whether the corresponding hard disk drive is an IDE or a SCSI hard disk drive.

11. A method for automated electronic tracking and protection of hard disk drives in a computer, the computer having a last known configuration including last known serial numbers corresponding to each of the hard disk drives, the method utilizing hard disk drives identification for monitoring and reporting the hard disk drives presence in the computer, the method comprising the steps of:

a) performing a power-up sequence upon power-up of the computer;

b) detecting the hard disk drives in the computer;

c) identifying the type of each of the hard disk drives;

d) issuing a system call to a device driver in order to retrieve the identification of each of the hard disk drives;

e) forming a serial number for each of the hard disk drives from the identification retrieved from each of the hard disk drives;

f) comparing the serial numbers with the corresponding last known serial numbers in order to determine if any of the hard disk drives has been replaced;

g) providing the serial numbers to a display in order to alert a computer user of a change in the hard disk drives if a mismatch is found between the serial numbers and the corresponding last known serial numbers; and h) copying the serial numbers to an RF-enabled memory in order to log a current configuration of the computer if the mismatch between the serial numbers and the corresponding last known serial numbers is found.

12. The method of claim 11, wherein the system call includes commands commensurate with the identified type of each of the hard disk drives.

13. The method of claim 11, wherein, the RF-enabled memory is linked to an RF reader through an antenna, and wherein the hard disk drives identification can be electronically monitored without having to form a direct physical contact with the hard disk drives.

14. A system for automated electronic tracking and protection of hard disk drives in a computer, the computer having a last known configuration including last known serial numbers corresponding to each of the hard disk drives, the system comprising:

means for retrieving current serial numbers from the hard disk drives;

a radio frequency (RF) enabled memory coupled to the retrieving means, the RF enabled memory for storing the last known serial numbers and for updating the last known serial numbers with the current serial numbers;

an RF link from the RF enabled memory to an RF reader, the RF reader for receiving the updated last known serial numbers; and means for reporting the serial numbers coupled to the retrieving means.

15. A computer readable medium including program instructions for retrieving and reporting serial numbers of hard disk drives in a computer system, the program instructions for:

a) electronically obtaining the serial number of each of the hard disk drives;

b) providing the serial number of each of the hard disk drives to a display via a browser; and c) copying the serial number of each of the hard disk drives to a radio frequency (RF) enabled memory, wherein the serial numbers can be logged utilizing an RF reader means.

16. A computer readable medium including program instructions for automated electronic tracking and protection of hard disk drives in a computer, the computer having a last known configuration including last known serial numbers corresponding to each of the hard disk drives, the method utilizing hard disk drives identification for monitoring and reporting the hard disk drives presence, the program instructions for:

a) performing a power-up sequence upon power-up of the computer;

b) detecting the hard disk drives in the computer;

c) identifying the type of each of the hard disk drives;

d) issuing a system call to a device driver in order to retrieve the identification of each of the hard disk drives;

e) forming a serial number for each of the hard disk drives from the identification retrieved from each of the hard disk drives;

f) comparing the serial numbers with the corresponding last known serial numbers in order to determine if any of the hard disk drives has been replaced;

g) providing the serial numbers to a display in order to alert a computer user of a change in the hard disk drives if a mismatch is found between the serial numbers and the corresponding last known serial numbers; and h) copying the serial numbers to an RF-enabled memory in order to log a current configuration of the computer if the mismatch between the serial numbers and the corresponding last known serial numbers is found.

* * * * *